US012657426B2

(12) United States Patent
Namioka et al.

(10) Patent No.: US 12,657,426 B2
(45) Date of Patent: Jun. 16, 2026

(54) TRAINING DEVICE, ANALYSIS DEVICE, TRAINING METHOD, AND STORAGE MEDIUM FOR HUMAN OPERATION TIME-SERIES ANALYSIS

(71) Applicant: KABUSHIKI KAISHA TOSHIBA, Tokyo (JP)

(72) Inventors: Yasuo Namioka, Nerima (JP); Atsushi Wada, Yokohama (JP); Takanori Yoshii, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1252 days.

(21) Appl. No.: 17/472,483

(22) Filed: Sep. 10, 2021

(65) Prior Publication Data

US 2022/0180149 A1 Jun. 9, 2022

(30) Foreign Application Priority Data

Dec. 4, 2020 (JP) ................................. 2020-202106

(51) Int. Cl.
*G06N 3/04* (2023.01)

(52) U.S. Cl.
CPC ..................................... *G06N 3/04* (2013.01)

(58) Field of Classification Search
None
See application file for complete search history.

(56) References Cited

U.S. PATENT DOCUMENTS

| | | | | |
|---|---|---|---|---|
| 7,450,002 B2 * | 11/2008 | Choi | ..................... | A61B 5/1118 |
| | | | | 600/595 |
| 9,775,520 B2 * | 10/2017 | Tran | ......................... | A43B 3/48 |
| 2005/0033200 A1 * | 2/2005 | Soehren | ............... | A61B 5/1117 |
| | | | | 600/595 |
| 2013/0030875 A1 | 1/2013 | Lee et al. | | |
| 2020/0380339 A1 | 12/2020 | Branson et al. | | |

(Continued)

FOREIGN PATENT DOCUMENTS

| | | |
|---|---|---|
| CN | 111712840 A | 9/2020 |
| JP | 2011-034402 A | 2/2011 |
| JP | 2019-32676 A | 2/2019 |

(Continued)

OTHER PUBLICATIONS

Ma et al., AttnSense: Multi-level Attention Mechanism For Multimodal Human Activity Recognition, Proceedings of the Twenty-Eighth International Joint Conference on Artificial Intelligence (IJCAI-19); 2019; pp. 3109-3115 (Year: 2019).*

(Continued)

*Primary Examiner* — Alan Chen
(74) *Attorney, Agent, or Firm* — Oblon, McClelland, Maier & Neustadt, L.L.P.

(57) ABSTRACT

According to one embodiment, a training device trains a first model. The first model estimates a period of a task from time-series data of an operation of a human. The device acquires first time-series data to which a label of the task is assigned. The device extracts a pattern from a period indicated by the label in the first time-series data. The pattern is used as a feature. The device generates timing data of an appearance timing of the pattern in the first time-series data. The device trains the first model by using the label, the first time-series data, and the timing data.

20 Claims, 21 Drawing Sheets

(56)  References Cited

U.S. PATENT DOCUMENTS

2020/0397346 A1    12/2020   Nakajima

FOREIGN PATENT DOCUMENTS

| JP | 2019-160013 | A | 9/2019 |
| JP | 2020-9411 | A | 1/2020 |
| JP | 2020-27324 | A | 2/2020 |
| JP | 2020-166315 | A | 10/2020 |

OTHER PUBLICATIONS

Murahari et al., On Attention Models for Human Activity Recognition, ISWC '18, Oct. 8-12, 2018; 99. 100-103 (Year: 2018).*

Combined Chinese Office Action and Search Report issued Dec. 30, 2024 in Chinese Patent Application No. 202111053746.5, (with English machine translation), 15 pages.

Yuwei, W. et al., "Deep Learning Foundations and Applications", Beijing Institute of Technology Press, Nov. 2020, 9 pages (with unedited computer-generated English translation).

Mahmud et al., "Human Activity Recognition from Wearable Sensor Data Using Self-Attention", arxiv. org, Cornell University Library, 201 Olin Library Cornell University, Ithaca, NY 14853, Mar. 17, 2020, XP081625352, 8 pages.

Japanese Notice of Reasons for Refusal Issued May 31, 2024 in Japanese Application No. 2020-202106 with English translation, 10 pgs.

Combined Chinese Office Action and Search Report issued Jun. 19, 2024 in Chinese Application 202111053746.5, (with unedited computer-generated English translation), 12 pages.

Japanese Office Action issued Oct. 16, 2024 in Japanese Application 2020-202106, (with unedited computer-generated English translation), 5 pages.

Zhang, Y. et al., "Human Activity Recognition Based on Motion Sensor Using U-Net", IEEE, vol. 7, 2019, pp. 75213-75226.

Combined Chinese Advisory Action and Search Report issued Mar. 24, 2025 in Chinese Patent Application No. 202111053746.5 (with unedited computer-generated English Translation of Advisory Action only), 16 pages.

Mingyue, "Multi-Source Visual Information Perception and Recognition", Beijing University of Posts and Telecommunications Press, Aug. 31, 2020, 9 pages (with unedited computer-generated English Translation).

* cited by examiner

| NAME | ID |
|------|-----|
| PICKING | PCK |
| LABEL REPLACEMENT | REL |
| BOX ASSEMBLY | ASB |
| BOXING | PIB |
| BOX CLOSING | CLB |
| LABELING | ATL |
| LABEL READING | REL |
| PLACEMENT ON CART | POC |

FIG. 3 acbbbcbccbccbccdd

AD1

| $V1_{t1}$ | $V1_{t2}$ | $V1_{t3}$ | $V1_{t4}$ | • • • | $V1_{t(N-1)}$ | $V1_{tN}$ |
|---|---|---|---|---|---|---|
| $V2_{t1}$ | $V2_{t2}$ | $V2_{t3}$ | $V2_{t4}$ | • • • | $V2_{t(N-1)}$ | $V2_{tN}$ |
| $V3_{t1}$ | $V3_{t2}$ | $V3_{t3}$ | $V3_{t4}$ | • • • | $V3_{t(N-1)}$ | $V3_{tN}$ |
| $V4_{t1}$ | $V4_{t2}$ | $V4_{t3}$ | $V4_{t4}$ | • • • | $V4_{t(N-1)}$ | $V4_{tN}$ |
| ⋮ | ⋮ | ⋮ | ⋮ | | ⋮ | ⋮ |
| $V(M-1)_{t1}$ | $V(M-1)_{t2}$ | $V(M-1)_{t3}$ | $V(M-1)_{t4}$ | • • • | $V(M-1)_{t(N-1)}$ | $V(M-1)_{tN}$ |
| $VM_{t1}$ | $VM_{t2}$ | $VM_{t3}$ | $VM_{t4}$ | • • • | $VM_{t(N-1)}$ | $VM_{tN}$ |

TRAINING DEVICE, ANALYSIS DEVICE, TRAINING METHOD, AND STORAGE MEDIUM FOR HUMAN OPERATION TIME-SERIES ANALYSIS

CROSS-REFERENCE TO RELATED APPLICATIONS

This application is based upon and claims the benefit of priority from Japanese Patent Application No. 2020-202106, filed on Dec. 4, 2020; the entire contents of which are incorporated herein by reference.

FIELD

Embodiments described herein relate generally to training device, an analysis device, a training method, and a storage medium.

BACKGROUND

There is technology directed to improving work efficiency by analyzing the operation of a human. In such technology, it is desirable to start the analysis with less preparation.

BRIEF DESCRIPTION OF THE DRAWINGS

FIG. 3 is an example of a task table;

FIG. 10 is a schematic view illustrating array data generated from the time-series data;

DETAILED DESCRIPTION

Figure 1:
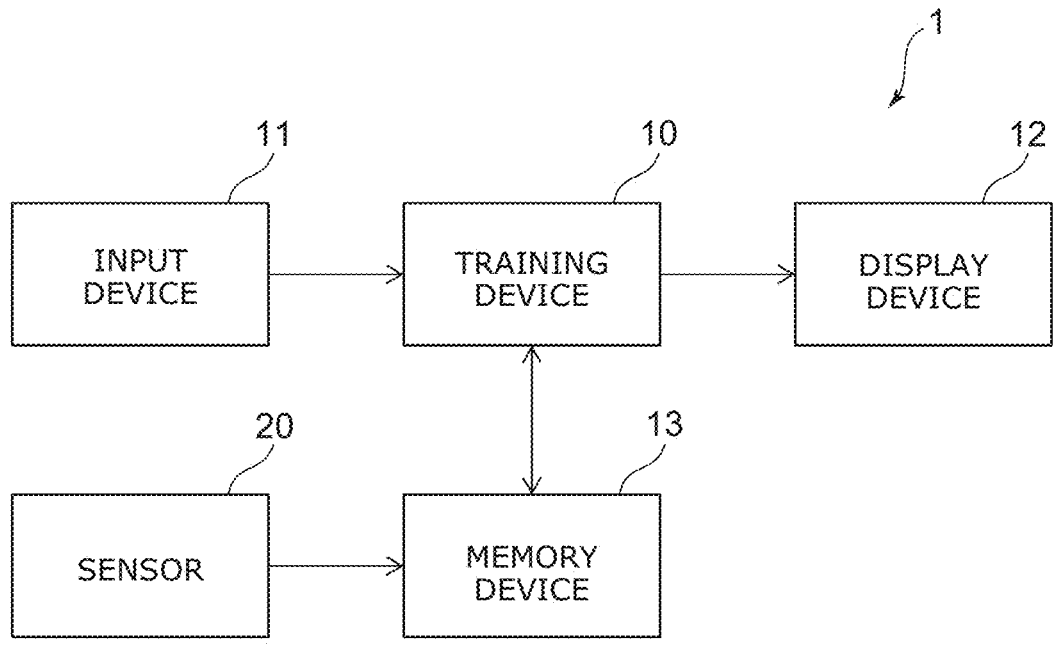
FIG. 1 is a schematic view illustrating a training system according to a first embodiment.

According to one embodiment, a training device trains a first model. The first model estimates a period of a task from time-series data of an operation of a human. The device acquires first time-series data to which a label of the task is assigned. The device extracts a pattern from a period indicated by the label in the first time-series data. The pattern is used as a feature. The device generates timing data of an appearance timing of the pattern in the first time-series data. The device trains the first model by using the label, the first time-series data, and the timing data.

Various embodiments are described below with reference to the accompanying drawings. In the specification and drawings, components similar to those described previously or illustrated in an antecedent drawing are marked with like reference numerals, and a detailed description is omitted as appropriate.

FIG. 1 is a schematic view illustrating a training system according to a first embodiment.

The training system 1 according to the first embodiment includes a training device 10, an input device 11, a display device 12, a memory device 13, and a sensor 20.

The sensor 20 collects data of an operation of a human. The human is a worker that performs a task. For example, the sensor 20 is an acceleration sensor or an angular velocity sensor. The sensor 20 is mounted to a portion of the body of the human and continuously collects data of the acceleration or the angular velocity of the portion of the body. Time-series data of the change of the acceleration or the angular velocity with respect to time is obtained thereby.

The training device 10 trains a first model. The first model estimates a period in which the worker performs the task from the time-series data of the operation of the human. The user uses the input device 11 to input data to the training device 10. The display device 12 displays data output from the training device 10. The memory device 13 stores data relating to the training.

FIGS. 2A and 2B and FIGS. 4A to 8B are schematic views describing processing of the training device according to the first embodiment. FIG. 3 is an example of a task table.

The training of the first model will now be described in detail with reference to FIGS. 2A to 8B.

Figure 2A:
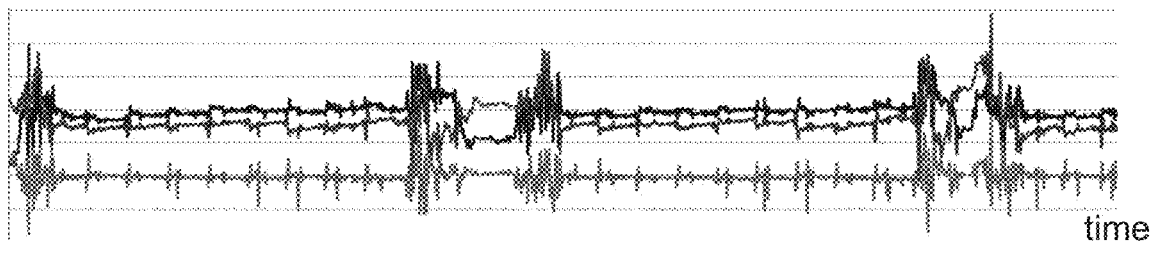
FIGS. 2A and 2B are schematic views describing processing of the training device according to the first embodiment.
Figure 2B:
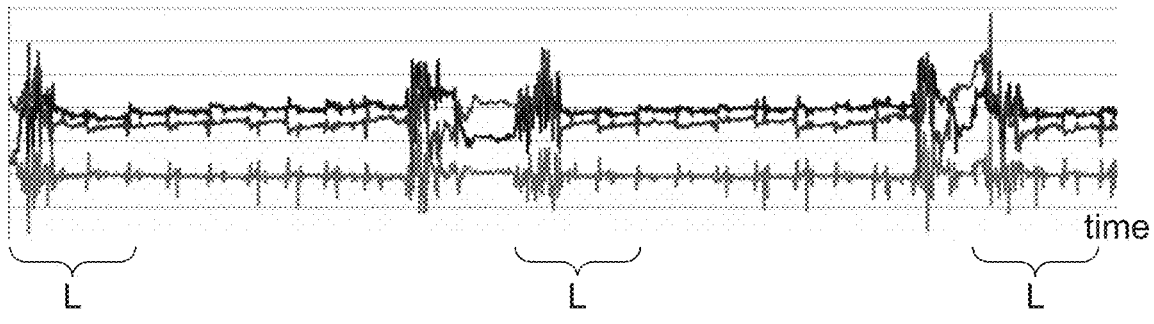

FIG. 2A is an example of time-series data of an acceleration acquired by the sensor 20. The horizontal axis is time. The vertical axis is the value of the acceleration. The user assigns a label of the task to the time-series data illustrated in FIG. 2A. Specifically, the label indicates the type of the task, the time at which the task started, and the time at which the task ended. The user uses the input device 11 to input the label to the training device 10. As illustrated in FIG. 2B, the period of the task is indicated by the label in the time-series data. As an example in FIG. 2B, a label L is assigned to indicate that a first task is being performed. The training device 10 accepts the input of the label and stores the input to the memory device 13.

The training device 10 associates the label input by the user with the object time-series data and stores the result in the memory device 13. Here, the time-series data for training to which the label is assigned is called "first time-series data".

Other than the label, the user preregisters tasks that the worker can perform. The registration data is stored in the memory device 13. For example, multiple tasks are registered in a task table as illustrated in FIG. 3. When labeling, the user inputs identification information for designating the task indicated by the label. The identification information is, for example, an ID or a name registered in the task table. An ID or a name that indicates the first task is input for the label L.

The training device 10 accesses the memory device 13 and acquires the first time-series data and the label for training the first model. For example, the training device 10 checks the label L assigned to the first time-series data illustrated in FIG. 2B. The training device 10 refers to the task table stored in the memory device 13 and determines whether or not the first task indicated by the label L exists in the task table. When the first task exists in the task table, the training device 10 associates the data obtained by the subsequent processing with the first task and stores the result in the memory device 13 as appropriate.

After acquiring the first time-series data and the label, to reduce the calculation amount, the training device 10 may perform one or two selected from reduction of the dimensions and symbolization for the time-series data.

For example, the first time-series data is multidimensional data. When the sensor 20 collects acceleration data in three axes, the first time-series data is three-dimensional data. When multiple sensors 20 are used, the first time-series data is data of six dimensions or more. The training device 10 reduces the dimensions of the first time-series data. For example, the training device 10 generates one-dimensional first time-series data by reducing the dimensions by principal component analysis (PCA).

Figures 4A, 4B, 4C, 4D:
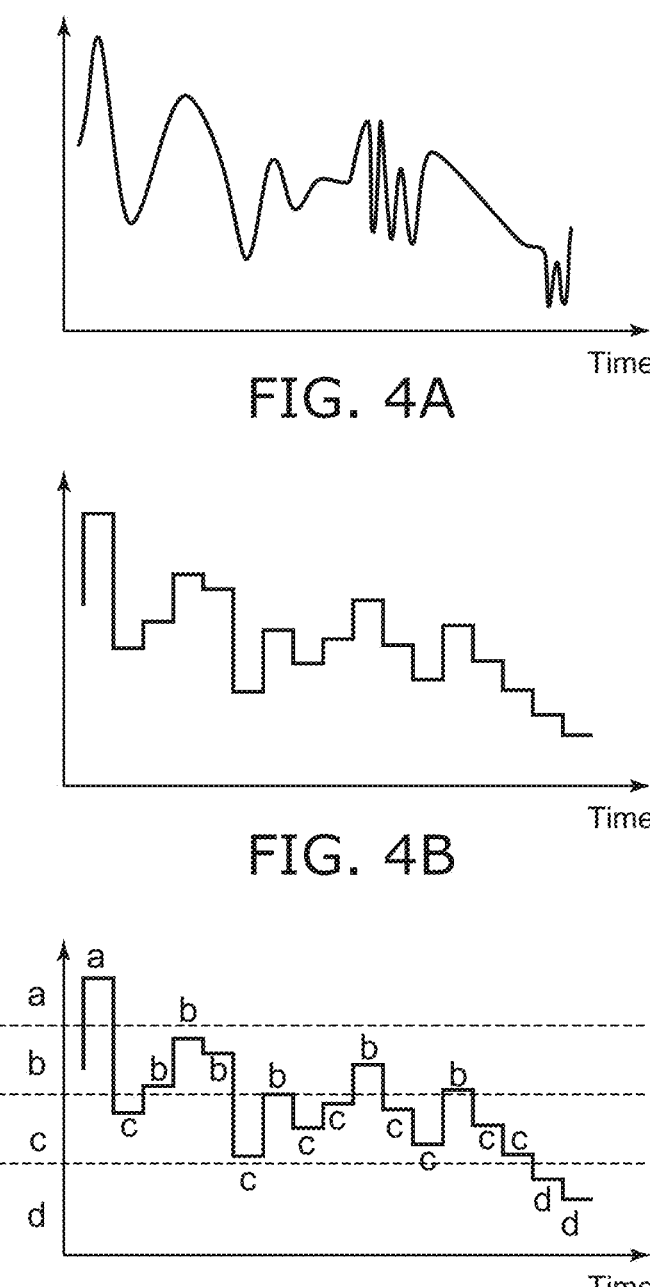
FIGS. 4A to 4D are schematic views describing processing of the training device according to the first embodiment.

The training device 10 may symbolize values at each time of the time-series data. FIG. 4A illustrates time-series data collected by the sensor 20. FIG. 4B illustrates the time-series data after downsampling. Time-series data in which the values change in a step configuration over time is obtained by downsampling. As illustrated in FIG. 4C, the training device 10 classifies the values of each time of the time-series data by using multiple thresholds b1 to b3. The values at each time of the time-series data are symbolized according to the classification result. The character strings illustrated in FIG. 4D are obtained thereby. The character strings that are obtained by the symbolization may be used as the time-series data.

The training device 10 extracts a pattern used as a feature from the period indicated by the label in the first time-series data. The pattern is a characteristic pattern of data appearing in the first time-series data when performing the task.

Figures 5A, 5B, 5C:
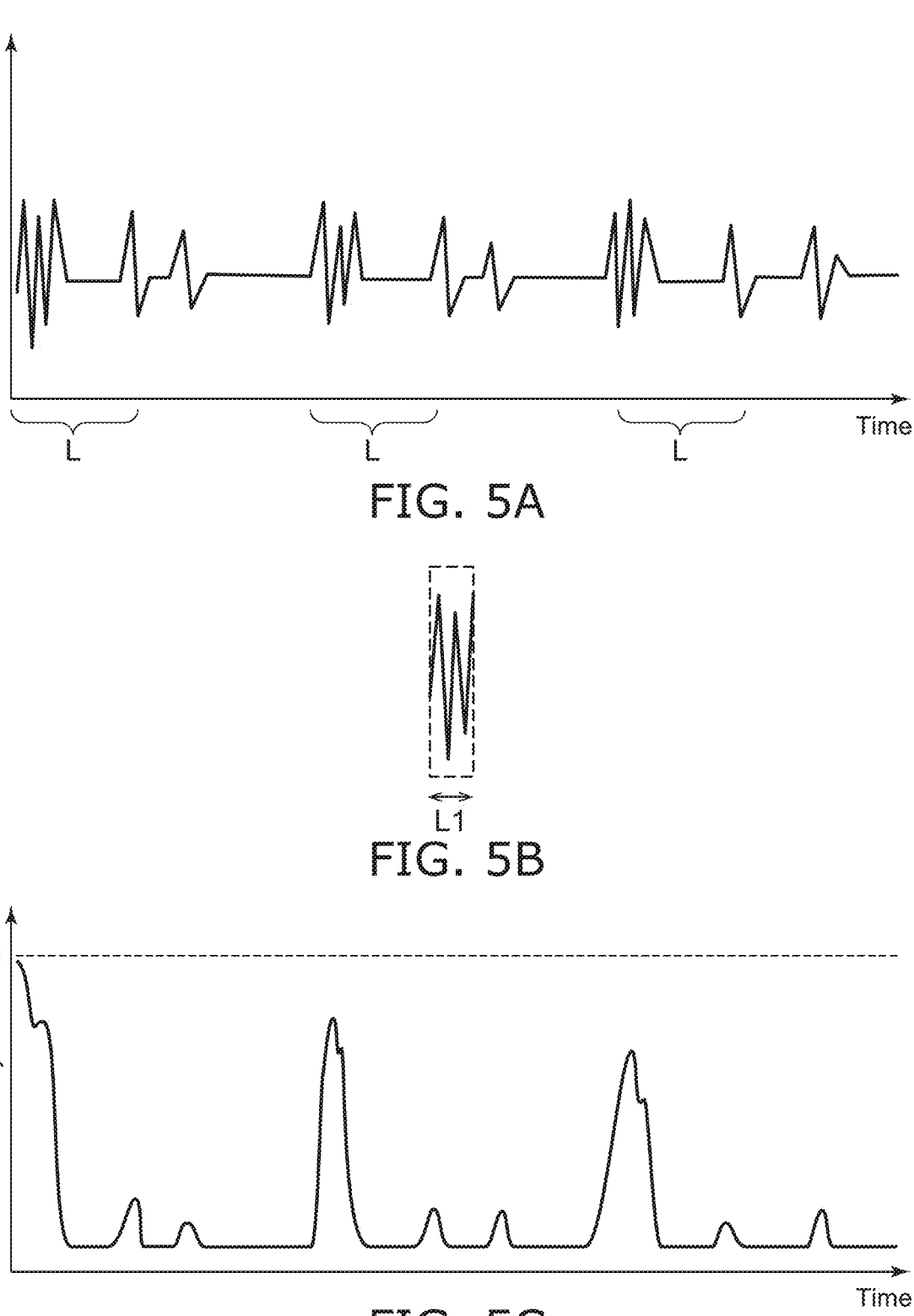
FIGS. 5A to 5C are schematic views describing processing of the training device according to the first embodiment.

FIG. 5A is a graph schematically illustrating first time-series data that is reduced to one dimension. In FIG. 5A, the horizontal axis is time, and the vertical axis is a value. FIG. 5B is an example of a candidate pattern cut out from the period of the label L. The candidate pattern is data that is used as a candidate of the pattern that is finally utilized.

For example, the user presets the length (the period) of the candidate pattern according to the sampling rate of the sensor 20, the agility of the operation during the task, etc. It is favorable for the length of the candidate pattern to be sufficiently greater than the sampling rate to increase the accuracy of the analysis. Also, it is favorable to set the length of the candidate pattern to be shorter as the agility of the operation increases.

The training device 10 may set the length of the cut-out candidate pattern based on a length that is preset by the user. The training device 10 changes the length of the cut-out candidate pattern around the preset length and cuts out multiple candidate patterns of different lengths. Or, the training device 10 may set the length of the candidate pattern according to the period of the label. The training device 10 sets the prescribed percentage of the period of the label as the length of the candidate pattern.

The training device 10 randomly cuts out the candidate pattern from the period of the label. Also, the training device 10 cuts out comparison data from the first time-series data. For example, the start time of the cutout of first comparison data is set to the start time of the first time-series data. The length of the comparison data is equal to the length of the candidate pattern.

The training device 10 calculates the similarity between the candidate pattern and the comparison data. The distance can be used as the similarity. A dynamic time warping (DTW) distance can be used as the distance. When the first time-series data is symbolized, a Levenshtein distance can be used as the distance. The training device 10 determines the similarity based on the reciprocal of the distance. The similarity that is obtained is used as the similarity between the candidate pattern and the first time-series data for the start time of the comparison data.

The training device 10 cuts out multiple sets of comparison data while shifting the start time. The shift amount of the start time is preset. Or, the shift amount of the start time may be set based on the sampling rate of the sensor 20, the length of the candidate pattern, or the period of the label. For example, when the sampling rate of the sensor 20 is 60 Hz, the training device 10 cuts out the sets of comparison data while shifting the start time $\frac{1}{60}$ seconds.

The training device 10 calculates the similarities between the candidate pattern and the multiple sets of comparison data. The multiple similarities are used as the similarities between the first time-series data and the candidate patterns for the start times of the multiple sets of comparison data. Time-series data of the similarity is obtained thereby. Hereinafter, the time-series data of the similarity is called "similarity data". FIG. 5C shows the similarity data between the first time-series data illustrated in FIG. 5A and the candidate pattern illustrated in FIG. 5B. In the example, a high similarity means that the configurations of the data are similar between the first time-series data and the candidate pattern at that time.

Figures 6A, 6B, 6C:
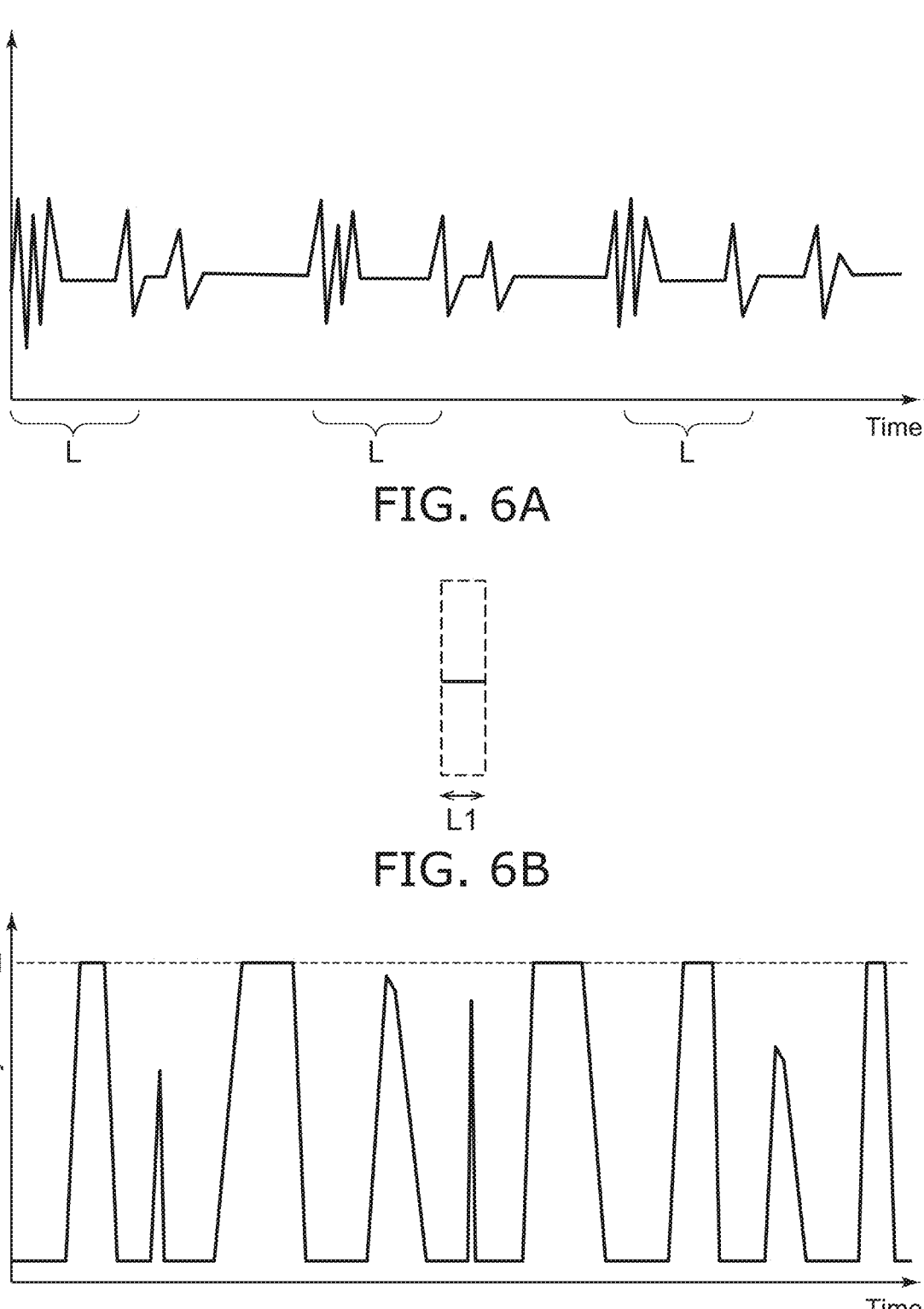
FIGS. 6A to 6C are schematic views describing processing of the training device according to the first embodiment.

Continuing, the training device 10 randomly cuts out another candidate pattern from the period of the label L. Similarly to the processing described above, the training device 10 calculates similarities between the other candidate pattern and the multiple sets of comparison data. Similarity data that relates to the other candidate pattern is obtained thereby. FIG. 6A is the same time-series data as FIG. 5A. FIG. 6B illustrates the other candidate pattern. FIG. 6C illustrates the similarity data for the candidate pattern illustrated in FIG. 6B.

The training device 10 repeats the cutout of the candidate pattern and the generation of the similarity data until the number of candidate patterns inside the period of the label L reaches a specified number.

The training device 10 calculates a score of each candidate pattern. The score indicates how appropriate the candidate pattern is as the pattern. The training device 10 calculates the score of the candidate pattern based on the respective similarity data. For example, the training device 10 counts the correct number and the incorrect number of the candidate pattern. The correct number is the number of times that the time at which the similarity exceeds the preset threshold is inside the period of the label in the similarity data. The incorrect number is the number of times that the time at which the similarity exceeds the threshold is outside the period of the label in the similarity data. The training device 10 increases the score as the correct number increases. The candidate pattern is more appropriate as the pattern as the score increases.

Figure 7A:
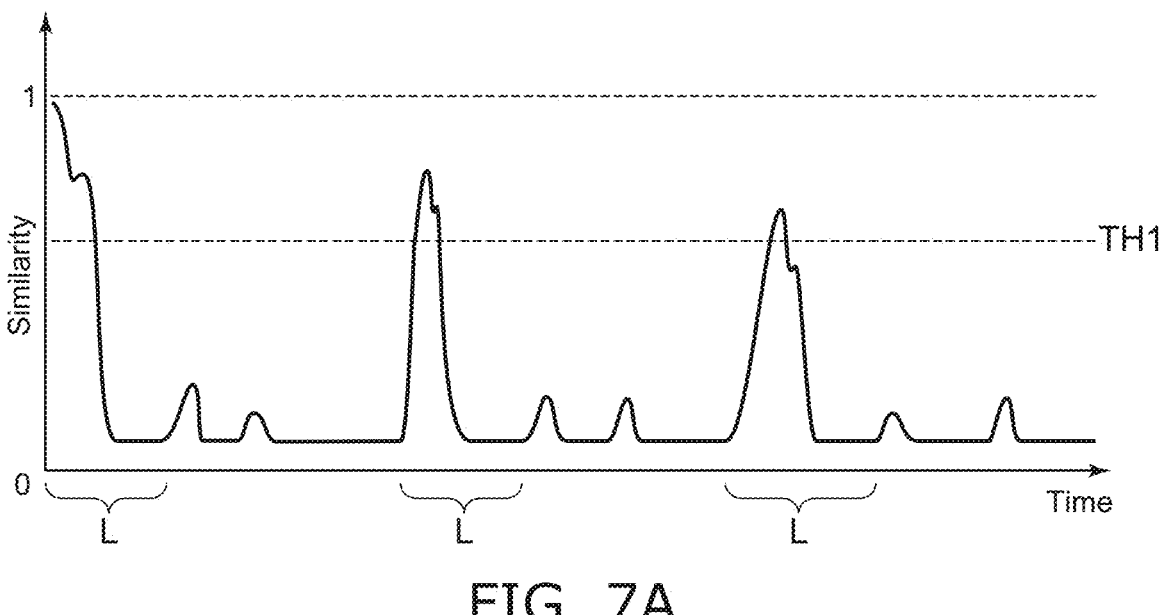
FIGS. 7A and 7B are schematic views describing processing of the training device according to the first embodiment.
Figure 7B:
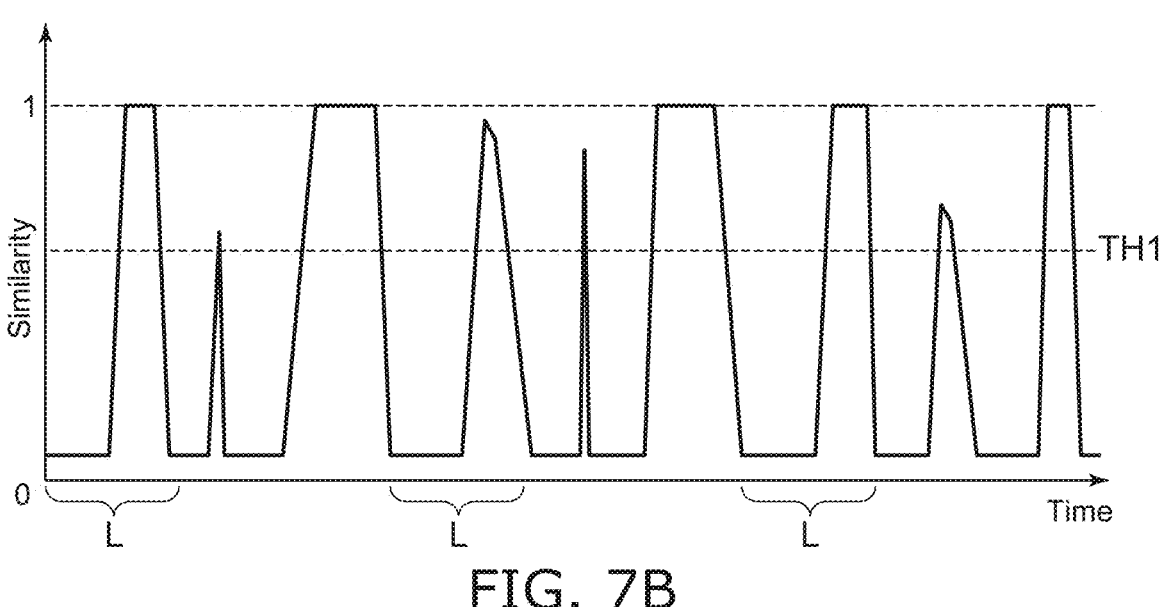

FIG. 7A is the similarity data illustrated in FIG. 5C. There are three times at which the similarity exceeds a threshold TH1 in the similarity data. Each time is inside the period of the label L. The ratio of the correct number and the incorrect number is 1:0. The training device 10 sets the score of the candidate pattern illustrated in FIG. 5B to "1". FIG. 7B is the similarity data illustrated in FIG. 6C. There are nine times at which the similarity exceeds the threshold TH1 in the similarity data. Three times are in the period of the label L. Six times are outside the period of the label L. The ratio of the correct number and the incorrect number is 0.33:0.67. The training device 10 sets the score of the candidate pattern illustrated in FIG. 6B to "0.33". From the comparison of the scores, it is determined that the candidate pattern illustrated in FIG. 5B is more appropriate as the pattern than the candidate pattern illustrated in FIG. 6B.

The training device 10 selects at least one of the multiple candidate patterns as the pattern based on the scores. In the case where the appropriateness as the pattern increases as the score of the candidate pattern increases, the training device 10 selects not less than one candidate pattern in order from the highest score. The training device 10 generates timing data by using the selected pattern. The timing data indicates the timing (the time) that the pattern appears in the first time-series data.

Figure 8A:
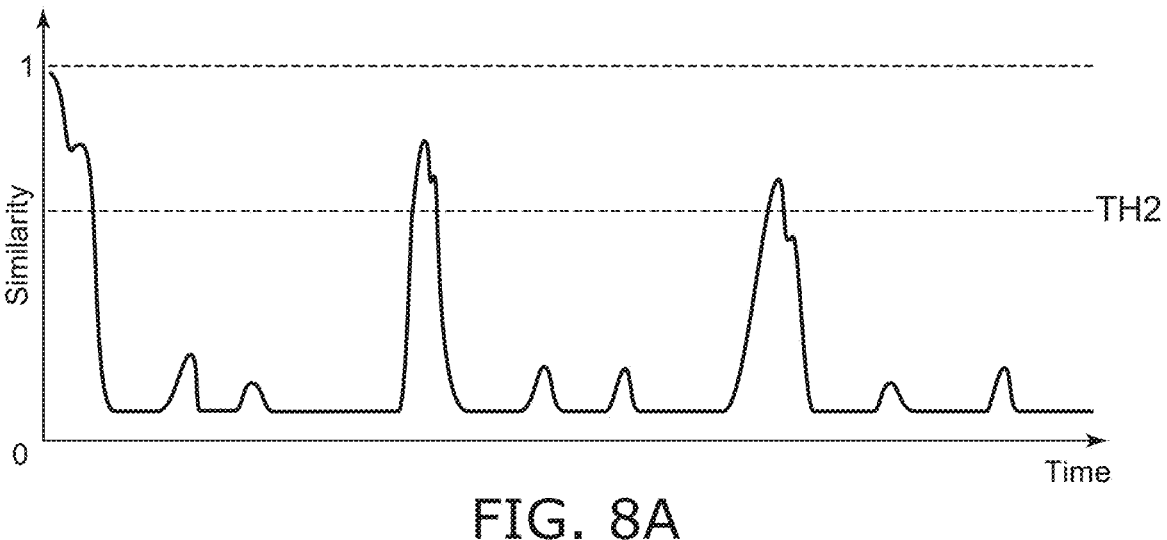
FIGS. 8A and 8B are schematic views describing processing of the training device according to the first embodiment.
Figure 8B:
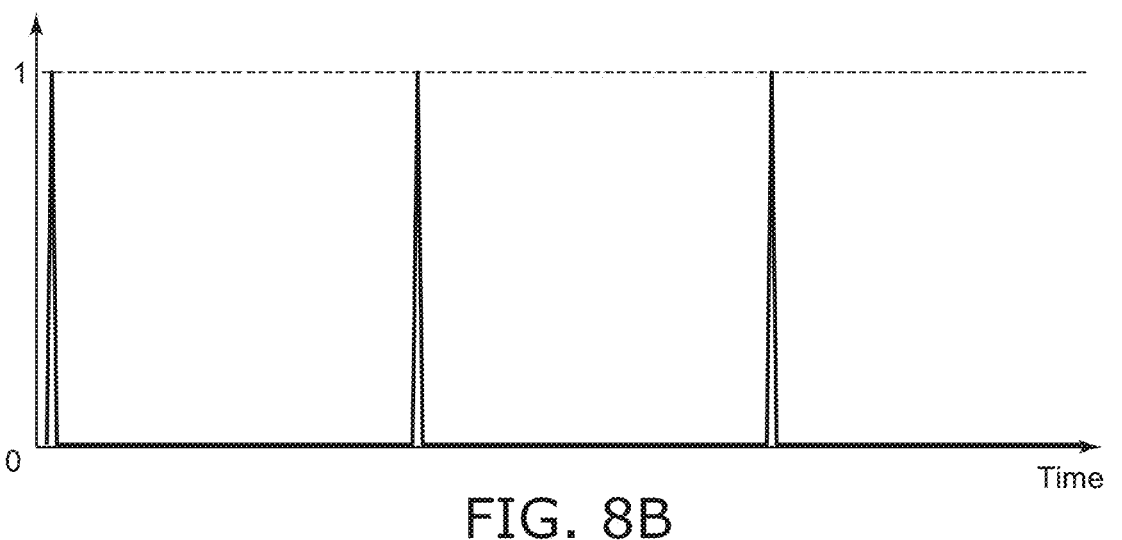

For example, the candidate pattern illustrated in FIG. 5B is selected as the pattern. FIG. 8A is the similarity data illustrated in FIG. 5C. The training device 10 designates the times at which the similarity exceeds a predetermined threshold TH2 in the similarity data. The threshold TH2 may be equal to the threshold TH1. It is considered that the pattern appears at the time at which the similarity exceeds the threshold TH2. The training device 10 assigns a numerical value that is greater than 0 to the times at which the similarity exceeds the predetermined threshold TH2, and assigns 0 to the other times. As illustrated in FIG. 8B, timing data of the timing at which the pattern of FIG. 5B appears is generated thereby. When multiple patterns are selected, timing data is generated for each of the patterns.

The training device 10 trains the first model by using the label, the first time-series data, and the timing data. The first model estimates the period of the task from the time-series data of the operation of the human.

It is favorable for the first model to include a neural network. By using a neural network, the period of the task can be estimated with higher accuracy. The configuration of the neural network is arbitrary. An example of a favorable neural network according to the first embodiment will now be described.

Figure 9:
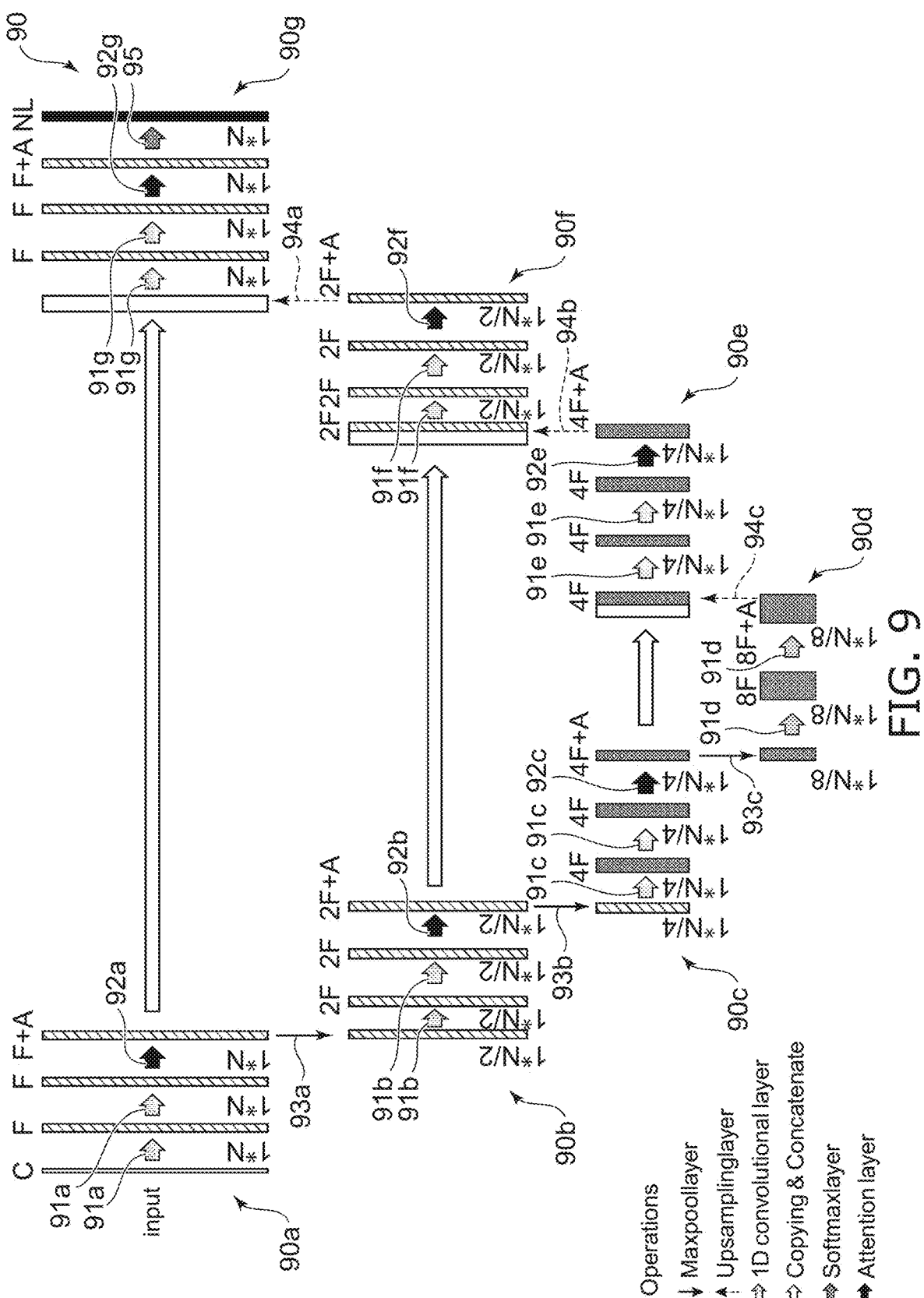
FIG. 9 is a schematic view illustrating the neural network included in the first model.

FIG. 9 is a schematic view illustrating the neural network included in the first model.

The training device 10 generates array data by two-dimensionally arranging the values included in the time-series data in M rows×N columns. The training device 10 may generate three-dimensional array data of M rows×N columns×C maps by superimposing the two-dimensional data of M rows×N columns as C feature maps. For example, the training device 10 arranges the time-ordered values of the time-series data as data of M rows×N columns×C maps and inputs the data to a neural network 90. An example will now be described in which the training device 10 arranges the values of the one-dimensional time-series data as data of 1 row×N columns×1 layer.

The input array data is input to a convolutional layer 91a and an attention layer 92a in a block 90a. The convolutional layer 91a outputs array data of F maps from the array data of the C maps. In addition to the array data of the F maps, the attention layer 92a outputs the attention of A maps. The attention is a distribution of weights for the vectors and indicates the region of the input array data to be given attention.

The array data of F maps+A maps is input to a max pooling layer 93a; and array data of 1 row×(N/2) columns×F maps is output. Similarly to the block 90a, the array data that is output is input to a convolutional layer 91b and an attention layer 92b of a block 90b. Array data of 1 row×(N/2) columns×(2F maps+A maps) is output from the block 90b. The array data that is output from the block 90b is input to a convolutional layer 91c and an attention layer 92c of a block 90c via a max pooling layer 93b; and array data of 1 row×(N/4) columns×(4F maps+A maps) is output. The array data that is output from the block 90c is input to a convolutional layer 91d and an attention layer 92d of a block 90d via a max pooling layer 93c; and array data of 1 row×(N/8) columns×(8F maps+A maps) is output.

The array data that is output from the block 90d is input to an upsampling layer 94c and is upsampled to array data of 1 row×(N/4) columns×4F maps. The array data that is output from the block 90c is copied and concatenated into a block 90e. The array data from the block 90c and the array data from the block 90d are superimposed and input to the block 90e. In the block 90e, the array data is input to a convolutional layer 91e and an attention layer 92e; and array data of 1 row×(N/4) columns×(4F maps+A maps) is output.

Similarly to the block 90e, the array data from the block 90e and the array data from the block 90b are input to a block 90f via an upsampling layer 94b. The array data is input to a convolutional layer 91f and an attention layer 92f; and array data of 1 row×(N/2) columns×(2F maps+A maps) is output. The array data from the block 90f and the array data from the block 90a are input to a block 90g via an upsampling layer 94a. The array data is input to a convolutional layer 91g, an attention layer 92g, and a softmax layer 95; and array data of 1 row×N columns×NL maps is output.

The neural network 90 outputs the estimation result of the task for the array data that is input. For example, when the array data that is output is in a first state, this means that the operation that corresponds to the input array data is performing the labeled task. When the array data that is output is in a second state, this means that the operation that corresponds to the input array data is performing an operation other than the labeled task.

The training device 10 trains the neural network 90 by using the first time-series data as input data and by using the label as teaching data. When the time of the array data that is input is inside the period of the label, the array data that indicates that the task is being performed may be added to the teaching data. When the time of the array data that is input is outside the period of the label, the array data that indicates that something other than the task is being performed may be added to the teaching data. The evaluation function when training includes a term that minimizes the difference between the data of the appearance timing of the pattern and a value that indicates the pattern appearance in the attention layer. As described above, the values that are included in the timing data are arranged in M rows×N columns×C map layers.

The appearance frequency of the pattern is high in the labeled task. The timing data indicates the times that the pattern appears. In other words, the timing data indicates the regions to be given attention in the array data. The first model can be efficiently trained by using the timing data to evaluate the trained first model. The training device 10 stores the trained first model in the memory device 13.

An example in which the first model has a so-called U-Net structure is described above. The first model may include another structure (e.g., Seg-Net) that includes convolutional layers and attention layers. The first model can effectively extract the feature from the time-series data due to the convolutional layers. The accuracy of the estimation by the first model can be increased by the attention layer indicating the regions to be given attention.

Figure 11:
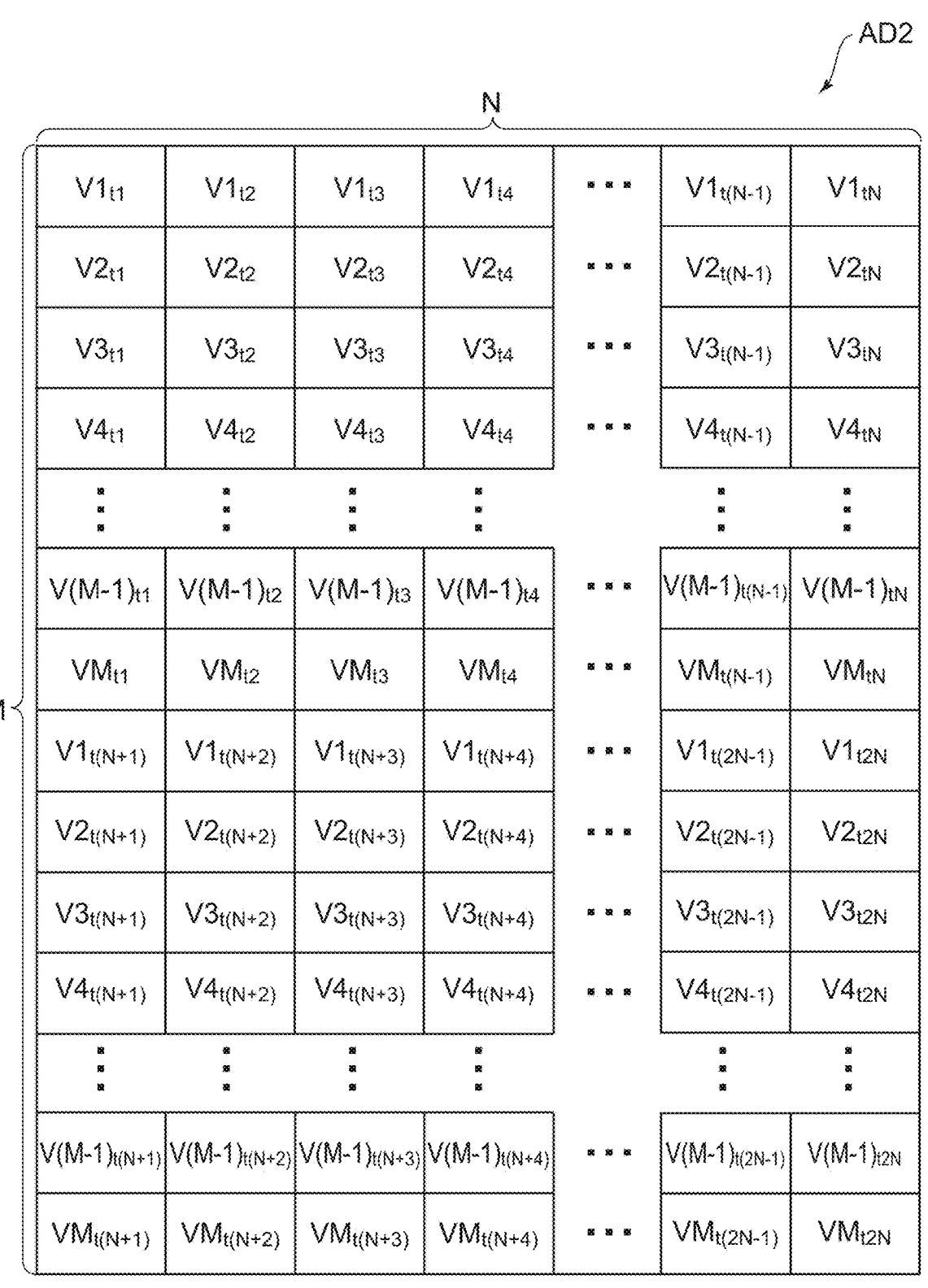
FIG. 11 is a schematic view illustrating array data generated from the time-series data.
Figure 12:
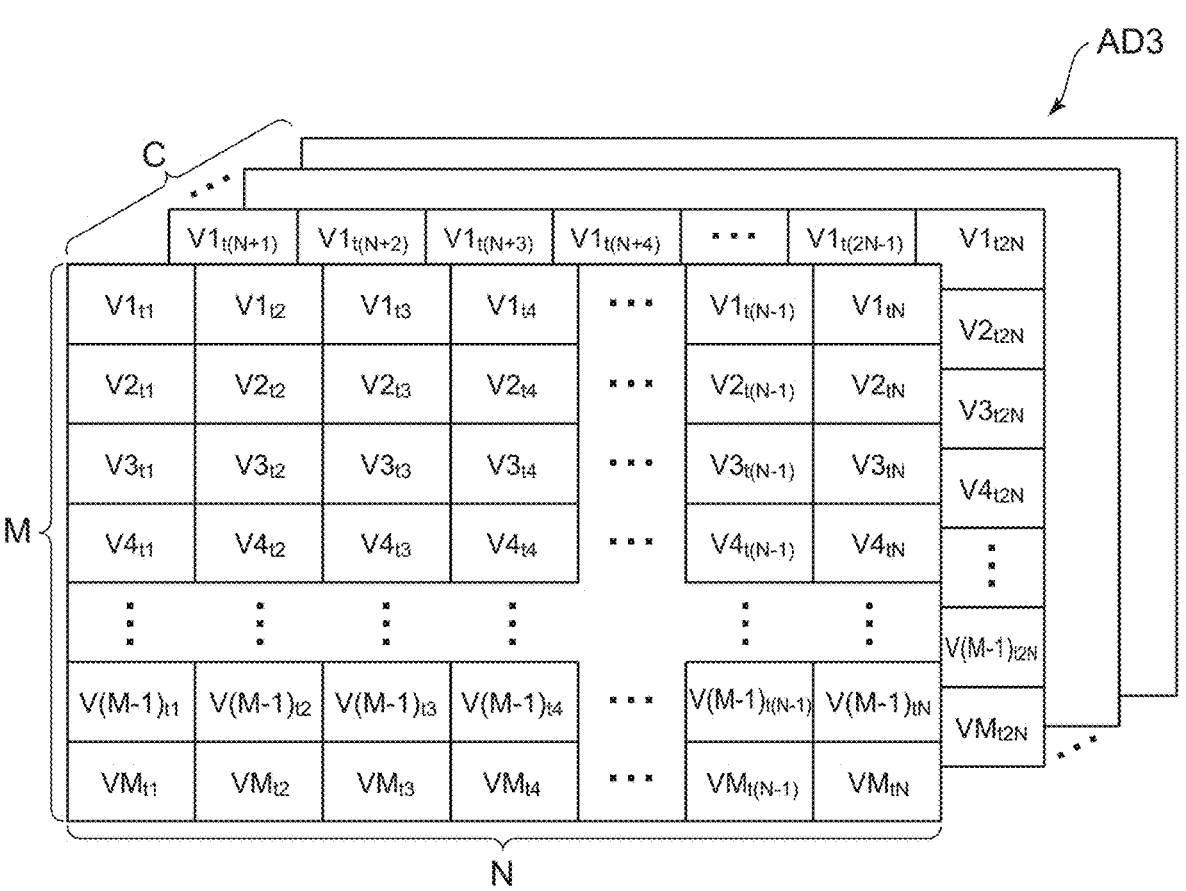
FIG. 12 is a schematic view illustrating array data generated from the time-series data.

FIGS. 10 to 12 are schematic views illustrating array data generated from the time-series data.

The training device 10 generates array data AD1 by arranging M-dimensional time-series data in, for example, M columns×N rows as illustrated in FIG. 10. In the example of FIG. 10, the data (the values) of each dimension are arranged in order of time in a row direction. The data of the first to Mth dimensions is arranged in the column direction. For example, the value $V1_{t1}$ is the value of the first dimension of the time-series data at a time U. The value $VM_{tN}$ is the value of the Mth dimension of the time-series data at a time tN. The size of N is arbitrary. For example, N is preset by the user.

In array data AD2 illustrated in FIG. 11, the M-dimensional time-series data is arranged in 2M columns. At the column-direction upper side, data of the times t1 to tN of the first to Mth dimensions are arranged. At the column-direction lower side, data of the times t(N+1) to t2N of the first to Mth dimensions is arranged. Thus, the number of sets of data arranged in one direction can be set regardless of the number of dimensions of the time-series data.

In array data AD3 illustrated in FIG. 12, M-dimensional time-series data is arranged in M columns×N rows and is superimposed onto C maps. Data of the times t1 to tN of the first to Mth dimensions are arranged in the first map. Data of the times t(N+1) to t2N of the first to Mth dimensions is arranged in the second map. Data of the time t((C−1)N+1) to tCN of the first to Mth dimensions is arranged in the Cth map. Thus, a tensor of M columns×N rows×C maps may be generated by superimposing time-ordered data.

Similarly to the time-series data, the training device 10 two-dimensionally arranges the timing data by using the arrangement method described above.

Figure 13:
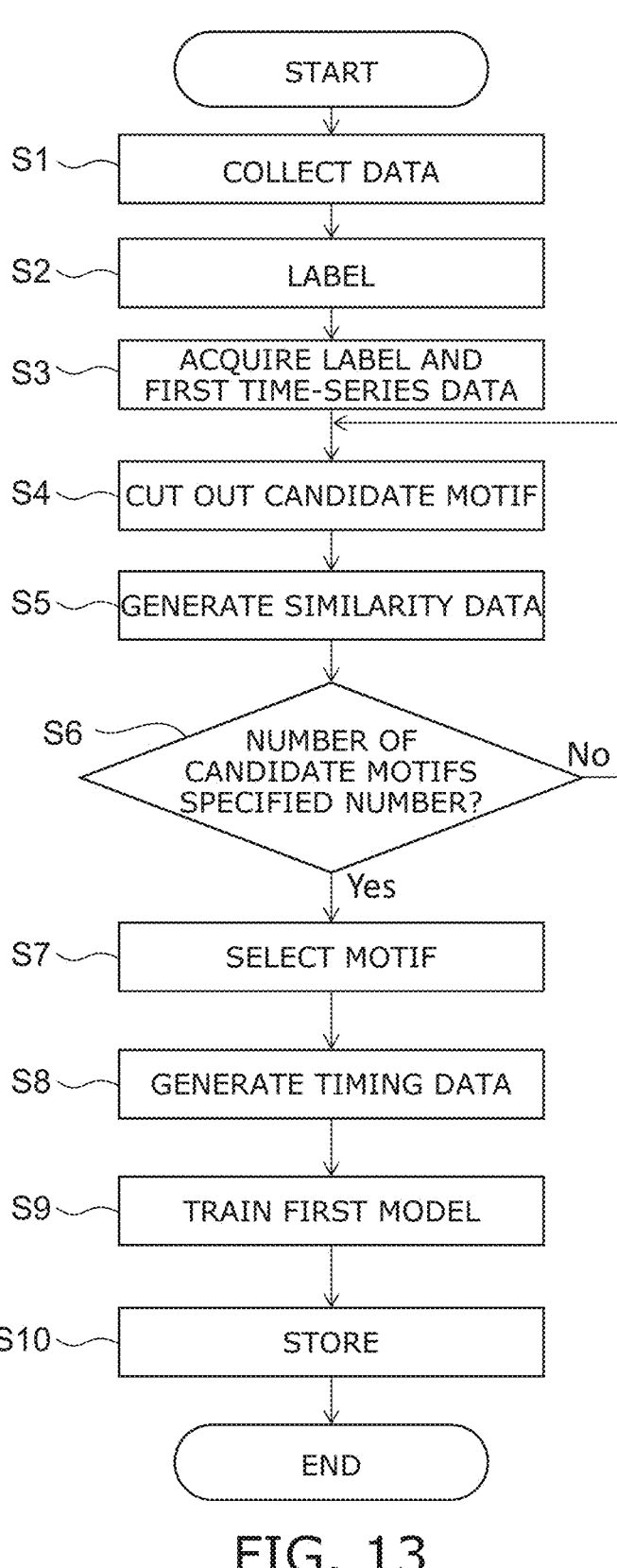
FIG. 13 is a flowchart illustrating a training method according to the training system according to the first embodiment.

FIG. 13 is a flowchart illustrating a training method according to the training system according to the first embodiment.

The sensor 20 collects data of an operation of a human (step S1). For example, the data is acceleration data; and the sensor 20 collects time-series data. A user assigns a label of the period of the task to the data used in the training (step S2). The training device 10 acquires the first time-series data for training and the label (step S3). The training device 10 cuts out a candidate pattern from the period indicated by the label in the first time-series data (step S4). The training device 10 uses the candidate pattern to generate similarity data (step S5).

The training device 10 determines whether or not the number of candidate patterns that are cut out has reached a specified number (step S6). When the number of candidate patterns is less than the specified number, the training device 10 re-executes step S4. When the number of candidate patterns is not less than the specified number, the training device 10 selects a pattern from the multiple candidate patterns (step S7). The training device 10 generates timing data for the selected pattern (step S8). The training device 10 trains the first model by using the label, the first time-series data, and the timing data (step S9). The training device 10 stores the trained first model in the memory device 13 (step S10).

Advantages of the first embodiment will now be described.

There is a method that extracts the pattern of each task from time-series data based on a preset task sequence and a preset task time and estimates the period of the task of the time-series data by using the pattern. This method is useful when the task sequence is fixed and the standard duration is clear. On the other hand, a task also exists in which the sequence, the time, etc., are not fixed. For example, in a logistics workplace, picking, label replacement, box assembly, boxing, box closing, labeling, label reading, placement on a cart, etc., are performed. The sequence, the duration, etc., of such a task may change according to the content of the packaged items, the number of packaged articles, the size of the articles, customer requirements, etc. Also, another task may be inserted into the task of an example. Technology that can analyze the time-series data even when the timing of performing the task or the duration of the task is not fixed is desirable.

As such technology, a method may be considered in which a model that estimates the period of the task in the time-series data according to the input of the time-series data is prepared. The model is trained using teacher data. However, generally, in supervised learning of a model, it is necessary to prepare much teaching data to obtain practical accuracy. It is necessary for the user to spend much time preparing the teaching data.

For this problem, the training device 10 according to the first embodiment extracts a pattern from first time-series data to which a label is assigned. Then, the training device 10 uses the pattern to generate timing data, and trains the first model by using the label, the first time-series data, and the timing data. By using the timing data, the timing to be given attention to estimate the task in the time-series data can be taught to the first model. Even when the teaching data is sparse, the accuracy of the first model can be sufficiently improved thereby. Compared to when the pattern and the timing data are not used, the teaching data that is necessary to train the first model can be reduced; and the load on the user can be reduced.

According to the first embodiment, it is sufficient for the user to input only the start time and the end time of the task and the type of the task when labeling. After the labeling, the training device 10 automatically extracts the pattern and trains the first model. Therefore, the first model can be easily trained by even a user that does not have expert knowledge in the labeling.

An example in which the first model estimates the period of one type of task in the time-series data is described above. The first model may be trained to be able to estimate periods of multiple types of tasks in the time-series data. In such a case, the training device 10 performs the extraction of the pattern, the generation of the timing data, and the training of the first model for the labels of the multiple types of tasks.

Specifically, the user assigns a first label of the first task and a second label of a second task to the time-series data. The first label indicates the time at which the first task started, the time at which the first task ended, and that the performed task is the first task. The second label indicates the time at which the second task started, the time at which the second task ended, and that the performed task is the second task. The training device 10 acquires the first time-series data to which the first and second labels are assigned. The training device 10 extracts a first pattern from the period indicated by the first label in the first time-series data. The training device 10 extracts a second pattern from the period indicated by the second label in the first time-series data.

The training device 10 generates first timing data of the timing at which the first pattern appears in the first time-series data. The training device 10 generates second timing data of the timing at which the second pattern appears in the first time-series data. The training device 10 trains the attention layers by using the first label and the first timing data. The training device 10 trains the attention layers by using the second label and the second timing data. The training device 10 trains the first model by using the first label, the second label, and the first time-series data.

Modification

The training device 10 may train the first model by focusing on only time-series data of a portion of dimensions included in multidimensional time-series data. For example, the sensor 20 is an image sensor included in an imaging device. The sensor 20 continuously collects images of the operation of the human. The imaging device stores the obtained video images in the memory device 13.

The training device 10 detects the pose of a human in an image. The pose is represented by the positions of parts and joints of the human. OpenPose or the like can be used to detect the pose. A part refers to one section of the body such as an eye, an ear, a nose, a head, a shoulder, an upper arm, a forearm, a hand, a chest, an abdomen, a thigh, a lower leg, a foot, etc. A joint refers to a movable joining part such as a neck, an elbow, a wrist, a lower back, a knee, an ankle, or the like that links at least portions of parts to each other.

Figure 14A:
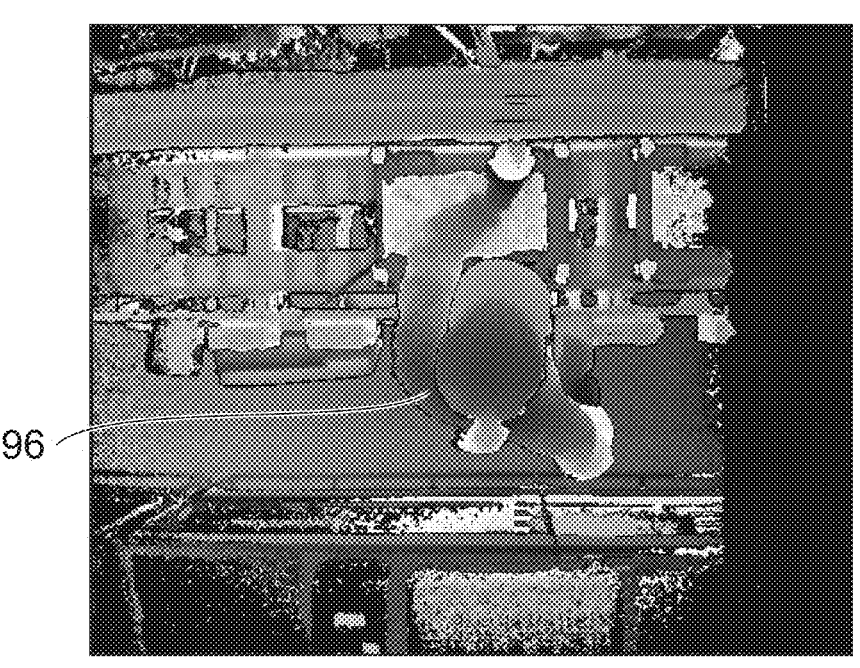
FIG. 14A is an example of an image.
Figure 14B:
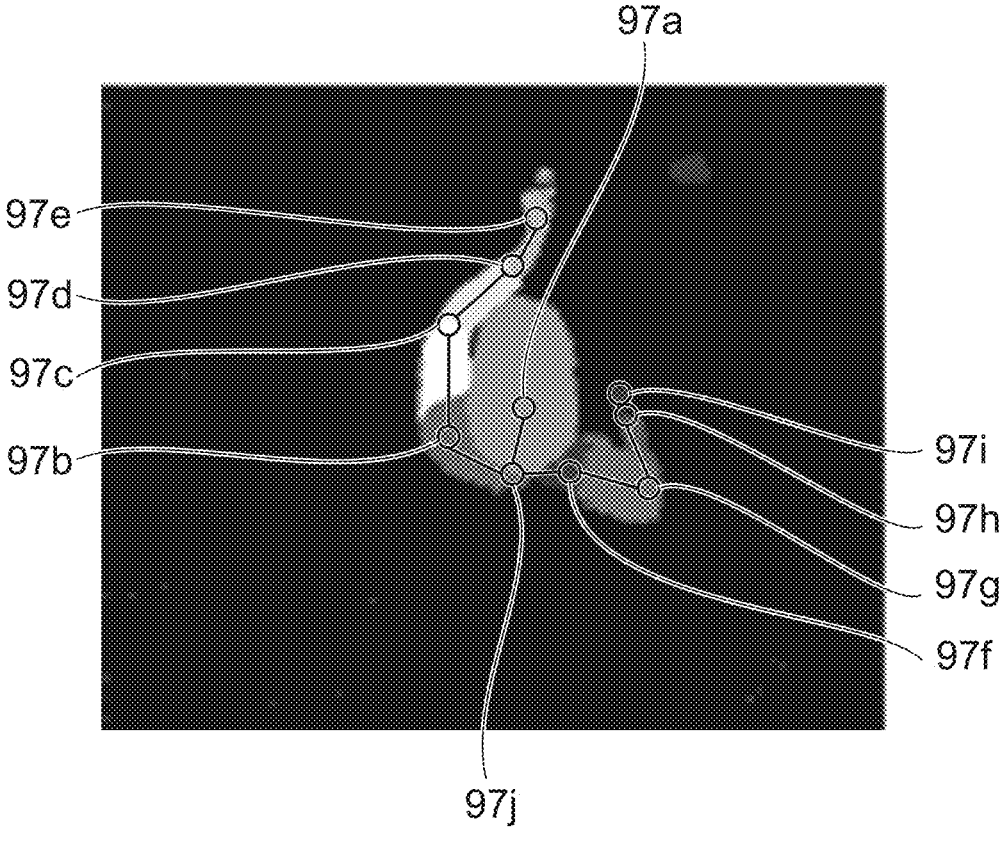
FIG. 14B is an example of a detection result of the pose.

FIG. 14A is an example of an image. FIG. 14B is an example of a detection result of the pose for FIG. 14A.

The training device 10 acquires a video image by accessing the memory device 13. As illustrated in FIG. 14A, the training device 10 acquires a static image of a human 96 from the video image. The training device 10 detects the pose of the human in the image. For example, as illustrated in FIG. 14B, the positions of a head 97a, a left shoulder 97b, a left elbow 97c, a left wrist 97d, a left hand 97e, a right shoulder 97f, a right elbow 97g, a right wrist 97h, a right hand 97i, and a spine 97j of the human 96 are detected.

The training device 10 sequentially performs pose detection for images at each time of the video image. Time-series data of the positions of the parts and the positions of the joints at each time are obtained thereby. In the example illustrated in FIG. 14B, the position in an X-direction and the position in a Y-direction are collected as two-dimensional data for each of the head 97a, the left shoulder 97b, the left elbow 97c, the left wrist 97d, the left hand 97e, the right shoulder 97f, the right elbow 97g, the right wrist 97h, the right hand 97i, and the spine 97j; as an entirety, 20-dimensional time-series data is obtained.

The training device 10 causes the display device 12 to display the video image that is imaged by the imaging device. The user uses the input device 11 to input labels to the training device 10. Specifically, the user inputs the start time and the end time of the task and identification information of the task while checking the displayed video image.

m-dimensional time-series data in which the change is large in the period indicated by the label is extracted from n-dimensional time-series data of the entirety by the training device 10. m and n are integers. m is less than n. For example, the training device 10 calculates the average value and the dispersion of the entire time-series data in the period of the label. The training device 10 extracts the portion of the time-series data in which the dispersion is large. For example, the variance or the standard deviation is used as the dispersion.

The training device 10 extracts the pattern from the period indicated by the label in the extracted first time-series data. The pattern is extracted from the time-series data of each dimension. In other words, a m-dimensional pattern is extracted from the m-dimensional time-series data. The training device 10 generates m sets of similarity data and m sets of timing data by using the m-dimensional pattern and the m-dimensional time-series data. The training device 10 may generate m-dimensional similarity data and m-dimensional timing data. Thereafter, similarly to the processing described above, the first model is trained using the first time-series data and the timing data.

Figure 15A:
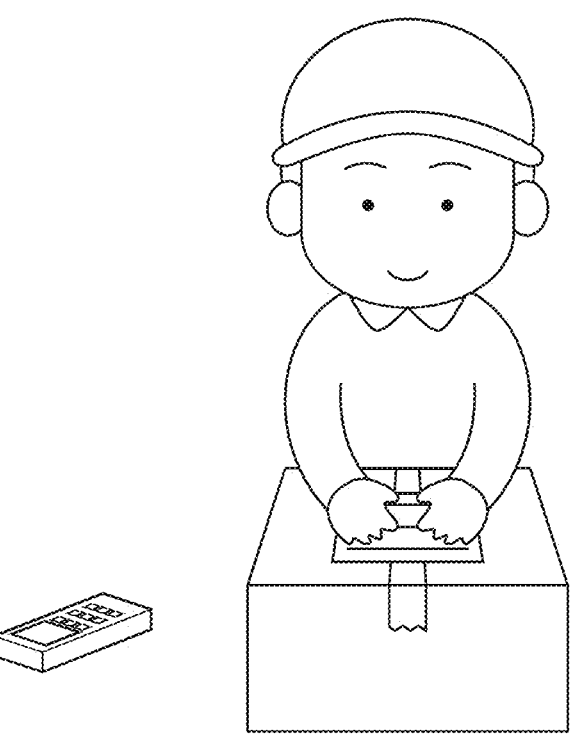
FIGS. 15A and 15B are schematic views illustrating states of a task.
Figure 15B:
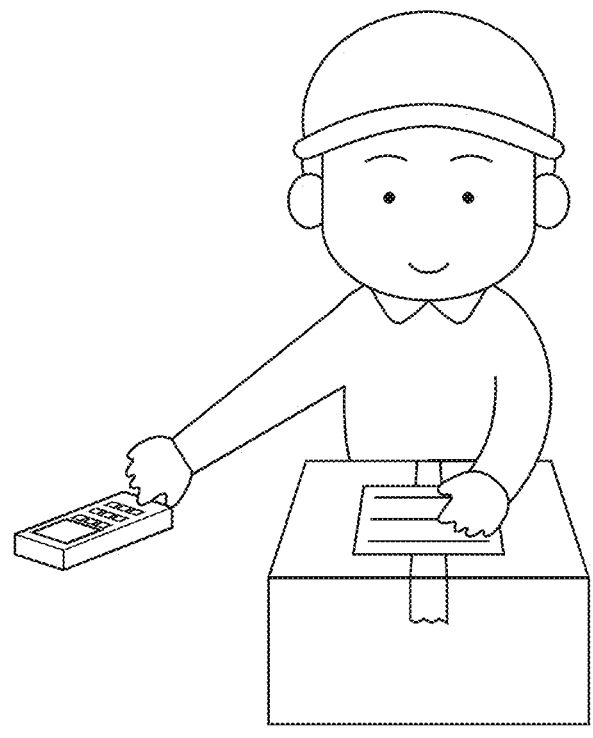

FIGS. 15A and 15B are schematic views illustrating states of a task.

In the example, the extraction of the portion of the time-series data in which the change is large corresponds to focusing on a portion of the parts of which the change is large. For example, in FIG. 15A, the human is labeling a packaged item. Subsequently, as illustrated in FIG. 15B, the human picks up a barcode reader located at the side and reads the barcode of the adhered label. At this time, in particular, the positions of the right hand, the right wrist, the right forearm, and the right elbow greatly change. The extraction of the portion of the time-series data by the training device 10 corresponds to extracting the changes of the positions of the right hand, the right wrist, the right forearm, and the right elbow from the changes of the positions of the parts and the joints.

Figure 16:
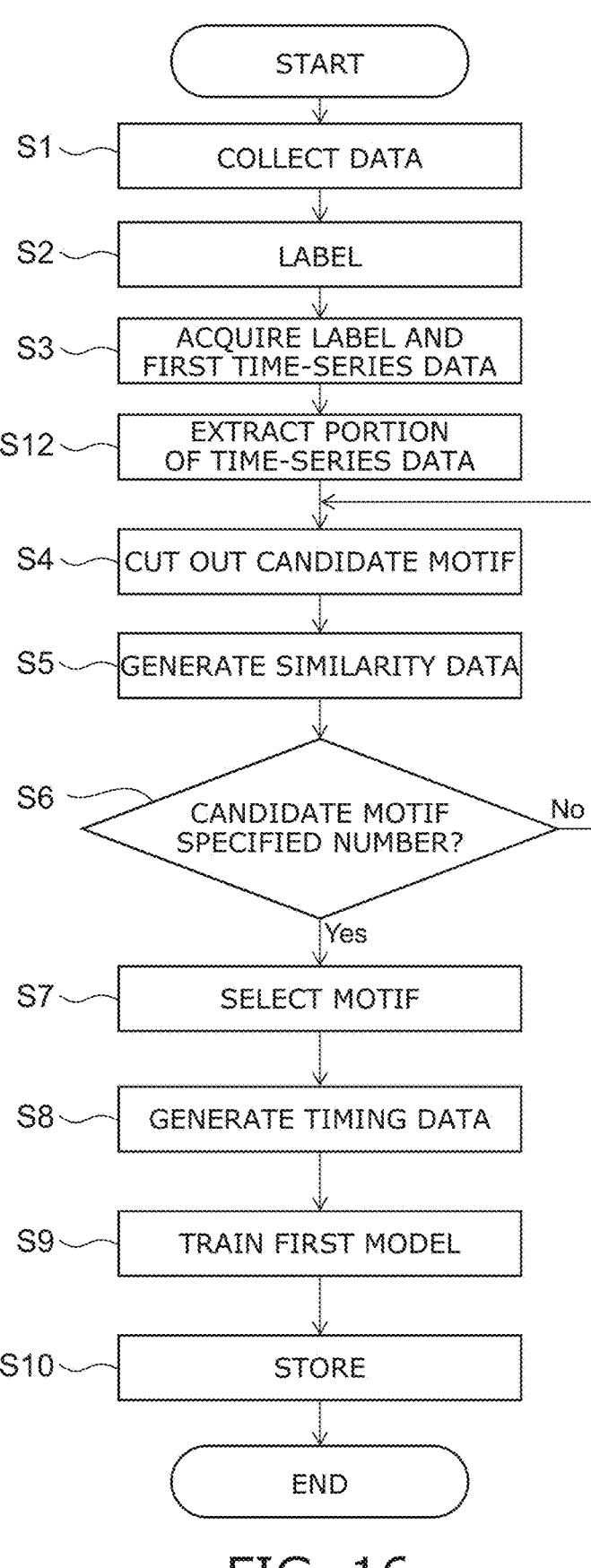
FIG. 16 is a flowchart illustrating the training method according to the training system according to the modification of the first embodiment.

FIG. 16 is a flowchart illustrating the training method according to the training system according to the modification of the first embodiment.

After step S3, the training device 10 extracts the time-series data of a portion of the dimensions from the multi-dimensional first time-series data (step S12). Thereafter, similarly to the flowchart illustrated in FIG. 13, the training device 10 executes step S4 and subsequent steps for the first time-series data of which the portion of the dimensions is extracted.

According to the modification, a task that includes a characteristic operation such as a designated part of the body greatly moving in a designated direction can be estimated with higher accuracy.

When arranging the time-series data acquired from the pose of the human to input to the first model, it is favorable for the data of adjacent parts or joints to be adjacent in the array data. For example, the data of the right hand, the right ankle, the right forearm, the right elbow, and the right upper arm is extracted as data having a large change. The extracted first time-series data is 10-dimensional data of the positions in the X-direction and the Y-direction of these parts and joints. When the data is arranged as illustrated in FIG. 10, it is favorable for the adjacent parts and joints to be adjacent in the array data as follows. Values V1 and V2 are respectively the positions in the X-direction and the Y-direction of the right hand. Values V3 and V4 are respectively the positions in the X-direction and the Y-direction of the right wrist. Values V5 and V6 are respectively the positions in the X-direction and the Y-direction of the right forearm. Values V7 and V8 are respectively the positions in the X-direction and the Y-direction of the right elbow. Values V9 and V10 are respectively the positions in the X-direction and the Y-direction of the right upper arm. By arranging the data of adjacent parts or joints to be adjacent in the array data, the feature is more easily extracted from the array data; and the accuracy of the estimation by the first model can be increased.

Second Embodiment

Figure 17:
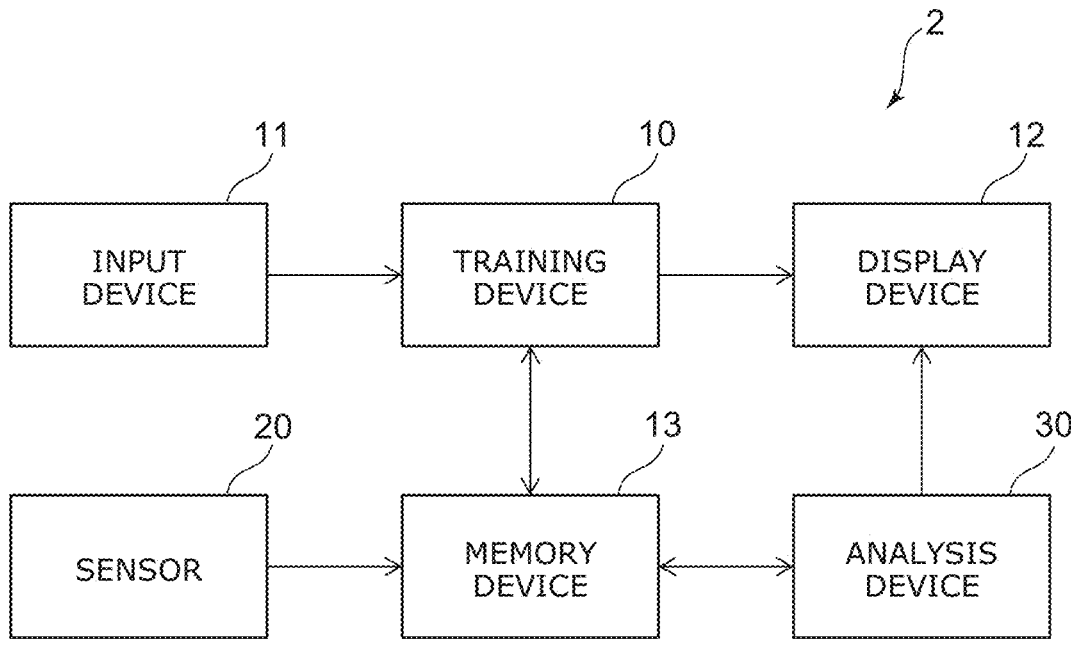
FIG. 17 is a schematic view illustrating an analysis system according to a second embodiment.

FIG. 17 is a schematic view illustrating an analysis system according to a second embodiment.

Compared to the training system 1, the analysis system 2 according to the second embodiment further includes an analysis device 30.

The sensor 20 collects data (e.g., acceleration data or an image) of the operation of the analysis object. The analysis device 30 accesses the memory device 13 and acquires the data of the operation and the first model trained by the training device 10. The data that is collected by the sensor 20 is used by the analysis device 30 as time-series data to input to the first model. Or, the analysis device 30 generates time-series data based on data collected by the sensor 20. Here, the time-series data for analysis that is input to the first model is called "second time-series data".

The analysis device 30 inputs the second time-series data to the first model. The analysis device 30 acquires the estimation result of the first model as the analysis result of the second time-series data. The analysis result indicates the period in which the task is performed in the second time-series data. The analysis device 30 stores the analysis result in the memory device 13.

By using the first model trained by the training device 10 in the analysis, the accuracy of the analysis can be increased. For example, even for a job in which the sequence of the task, the duration of the task, etc., are not defined, the period of the task can be analyzed with higher accuracy based on the time-series data of the operation.

Figure 18:
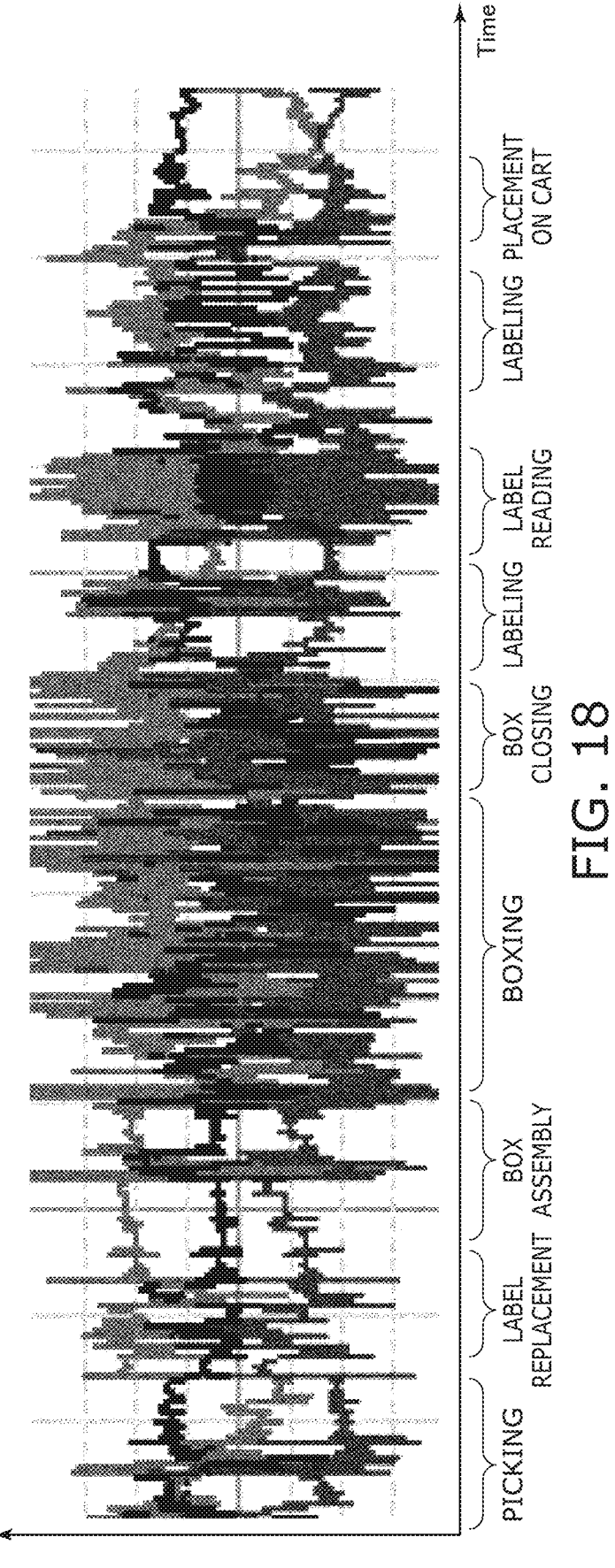
FIG. 18 is an output example of the analysis system according to the second embodiment.
Figure 19:
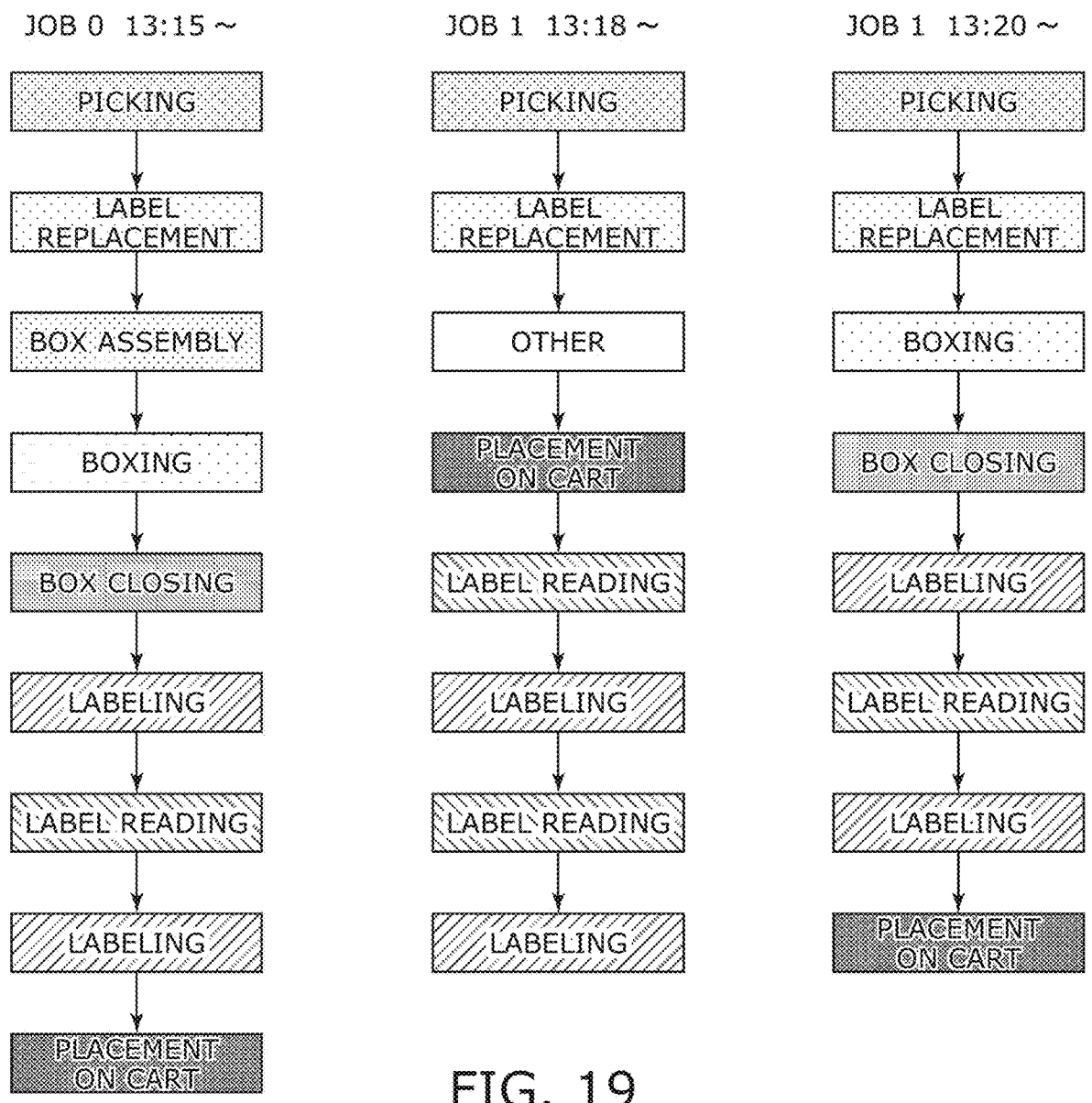
FIG. 19 is an output example of the analysis system according to the second embodiment.

FIGS. 18 and 19 are an output example of the analysis system according to the second embodiment.

Here, an example is described in which a worker performs picking, label replacement, box assembly, boxing, box closing, labeling, label reading, and placement on a cart in a logistics workplace.

The analysis device 30 displays the analysis result in the display device 12. For example, as illustrated in FIG. 18, the analysis device 30 displays the period of each task in the second time-series data together with information of the second time-series data and the tasks. In the example, the names of the tasks are displayed as the information of the tasks.

Or, when the period of the task is estimated by the first model, the analysis device 30 acquires the type of the task that is performed, the start time of the task, and the end time of the task. As illustrated in FIG. 19, the tasks that are performed are arranged in order of time and displayed by the analysis device 30. At this time, as illustrated in FIG. 19, the analysis device 30 may display the time that a job (job) that includes one group of tasks is started. The analysis device 30 may display the same type of task in the same form and may display tasks of different types in mutually-different forms.

The start of the job is determined based on one, two, or more of recognition of the worker in the image, movement of the worker to a prescribed position in the image, or appearance of some pattern. The end of the job is determined based on one, two, or more of the nonexistence of the worker in the image, movement of the worker outside the image, movement of the worker to a prescribed position in the image, or the elapse of a preset amount of time.

In the example illustrated in FIG. 19, an operation other than the task is designated as "other" in the time-series data. For example, the analysis device 30 may calculate the similarity between the second time-series data and the pattern and may generate similarity data relating to the second time-series data. The analysis device 30 uses the similarity data to generate timing data of the appearance timing of the pattern in the second time-series data. When a pattern does not appear in a prescribed period, the analysis device 30 determines that the task has ended. The analysis device 30 determines that an operation other than the task exists in at least a portion of the period from the last appearance of the pattern to the next appearance of the pattern. The "other" operation corresponds to an operation other than the task registered in the task table illustrated in FIG. 3.

The analysis device 30 may extract a change point of a state included in the time-series data. For example, a hidden Markov model for a hierarchical Dirichlet process (HDP-HMM), k-means algorithm, x-means algorithm, or spectral clustering is used to extract the change point of the state. The analysis device 30 determines that an operation other than the task exists from one change point after the appearance of the last pattern to another change point before the appearance of the next pattern.

The analysis device 30 may determine the operation other than the task based on both the appearance timing of the pattern in the second time-series data and the change point of the state in the second time-series data. For example, the analysis device 30 determines that the task ended at the change point directly after the last appearance of the pattern. The analysis device 30 determines that the task has started at the change point directly before the next appearance of the pattern.

Due to the display of the analysis result, the user can easily ascertain what kind of task the worker is performing, in what sequence, and in about how much time.

Figure 20:
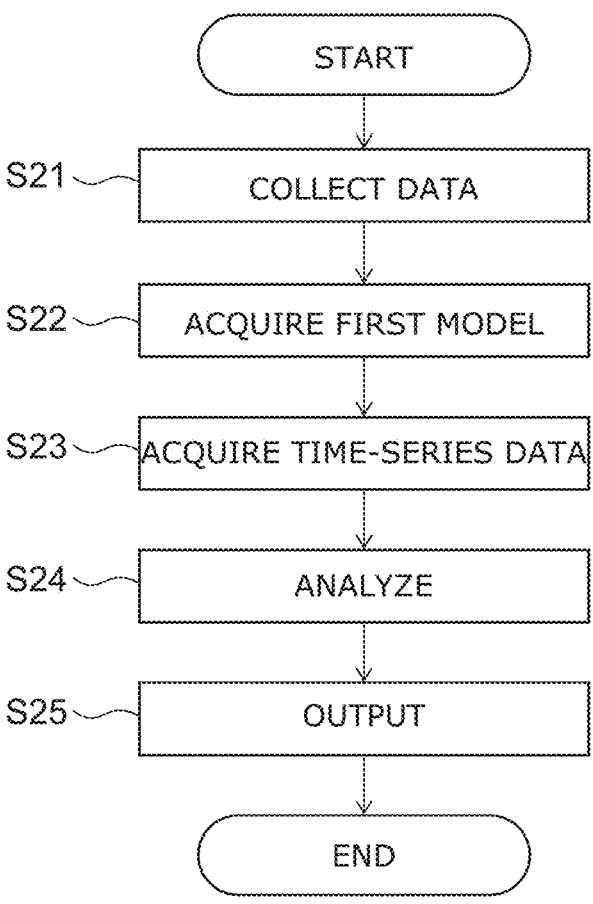
FIG. 20 is a flowchart illustrating an analysis method according to the analysis system according to the second embodiment.

FIG. 20 is a flowchart illustrating an analysis method according to the analysis system according to the second embodiment.

The sensor 20 collects data of the operation of the human of the analysis object (step S21). The analysis device 30 acquires the first model that is trained by the training device 10 (step S22). The analysis device 30 acquires the second time-series data that is input to the first model (step S23). The analysis device 30 inputs the second time-series data to the first model and performs the analysis (step S24). The analysis device 30 outputs the analysis result (step S25).

Figure 21:
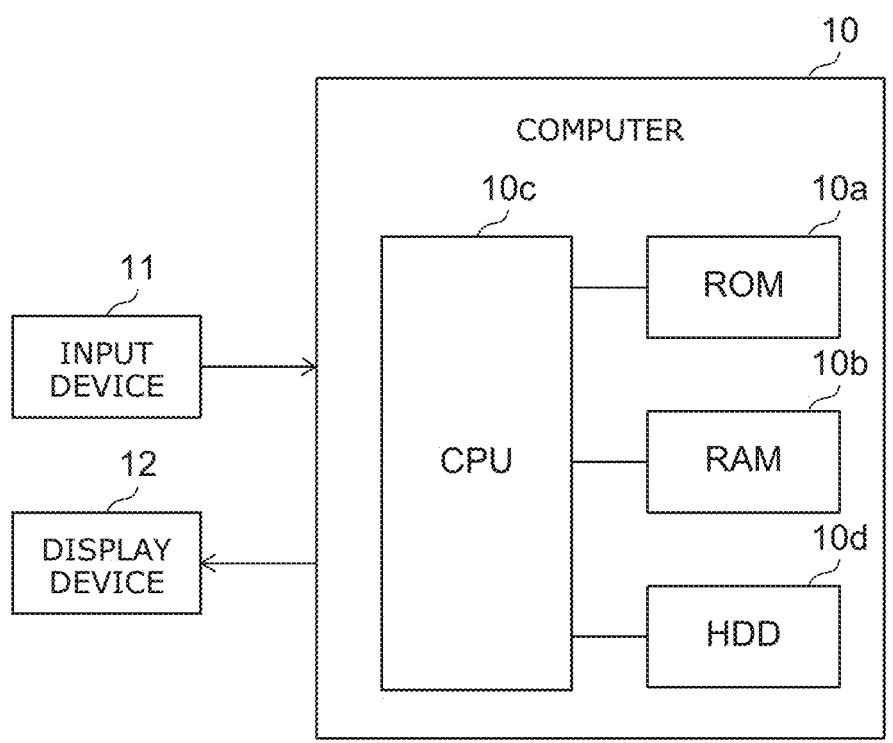
FIG. 21 is a schematic view illustrating a hardware configuration.

FIG. 21 is a schematic view illustrating a hardware configuration.

For example, the training device 10 is a computer and includes read-only-memory (ROM) 10a, random-access memory (RAM) 10b, a central processing unit (CPU) 10c, and a hard disk drive (HDD) 10d.

The ROM 10a stores programs controlling the operations of the computer. The ROM 10a stores programs necessary for causing the computer to realize the processing described above.

The RAM 10b functions as a memory region where the programs stored in the ROM 10a are loaded. The CPU 10c includes a processing circuit. The CPU 10c reads a control program stored in the ROM 10a and controls the operation of the computer according to the control program. The CPU 10c loads various data obtained by the operation of the computer into the RAM 10b. The HDD 10d stores data necessary for the processing of the training device 10 and data obtained by the processing. The HDD 10d may function as the memory device 13.

Instead of the HDD 10d, the training device 10 may include an embedded multimedia card (eMMC), a solid state drive (SSD), a solid state hybrid drive (SSHD), etc.

The input device 11 includes, for example, at least one selected from a mouse, a keyboard, a microphone (audio input), and a touchpad. The display device 12 includes, for example, at least one selected from a monitor and a projector. A device such as a touch panel that functions as both the input device 11 and the display device 12 may be used.

A hardware configuration similar to that of the training device 10 is applicable to the hardware configuration of the analysis device 30. One computer may function as the training device 10 and the analysis device 30. Or, the processing and the functions of the training device 10 and the analysis device 30 may be realized by collaboration between more computers.

According to the training device, the training system, or the training method described above, the accuracy of the first model can be increased using less teaching data. According to the analysis device, the analysis system, or the analysis method, the accuracy of the analysis can be increased by analyzing time-series data by using the trained first model. Similar effects also can be obtained by using a program for causing a computer to operate as the training device or the analysis device.

The processing of the various data described above may be stored in a nontemporary storage medium (a non-transitory computer readable storage medium) that can be read by a computer such as a magnetic disk (a flexible disk, a hard disk, etc.), an optical disk (CD-ROM, CD-R, CD-RW, DVD-ROM, DVD±R, DVD±RW, etc.), semiconductor memory, etc., as a program that can be executed by the computer.

For example, the data that is recorded in the storage medium can be read by a computer (or an embedded system). The recording format (the storage format) of the storage medium is arbitrary. For example, the computer reads the program from the storage medium and causes a CPU to execute the instructions recited in the program based on the program. The acquisition (or the reading) of the program by the computer may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A system comprising:
an acceleration sensor configured to be attached to a portion of a body of a human; and
a training device including at least one processor and at least one memory storing instructions and configured to train a first model, the first model estimating a period of a task from time-series data of an operation of a human,

wherein the training device is configured to
acquire first time-series data, from the acceleration sensor when the acceleration sensor is attached to the portion of the body of the human, to which a label of the task is assigned,
extract a pattern from a period indicated by the label in the first time-series data, the pattern being used as a feature,
calculate a similarity between the pattern and each of a plurality sets of comparison data to generate time-series data of similarity, the plurality sets of comparison data being cut out from the first time-series data,
generate timing data of an appearance timing of the pattern in the first time-series data by binarizing the time-series data of similarity through comparison with a predetermined threshold, and
train the first model by using the label, the first time-series data, and the timing data.

2. The system according to claim 1, wherein
the first time-series data is multidimensional,
the training device reduces dimensions of the first time-series data, and
the training device extracts the pattern from the reduced first time-series data.

3. The system according to claim 1, wherein
the first time-series data is multidimensional data of operations of a plurality of parts and operations of a plurality of joints of a body,
the training device extracts a portion of dimensions of the first time-series data,
the training device extracts the pattern from the extracted first time-series data and generates the timing data for each dimension of the portion of dimensions, and
the training device trains the first model by using the label, the extracted first time-series data, and a plurality of sets of the timing data.

4. The system according to claim 1, wherein
a plurality of the labels of a plurality of the tasks is assigned to the first time-series data,
the training device extracts a plurality of the patterns respectively from a plurality of periods indicated by the labels,
the training device generates a plurality of sets of the timing data of appearance timing of the plurality of patterns in the first time-series data, and
the training device trains the first model by using the labels, the first time-series data, and the sets of timing data to cause the first model to estimate periods of the tasks from the time-series data.

5. The system according to claim 1, wherein
the training device generates array data by two-dimensionally arranging values of the first time-series data,
the array data is input to the first model, and
the training device trains the first model by using the label, the array data based on the first time-series data, and the timing data.

6. The system according to claim 1, wherein
the first model includes a neural network including a convolutional layer and an attention layer,
the training device trains the first model by using the first time-series data as input data and by using the label as teaching data, and
the training device uses the timing data to evaluate the first model when training.

7. The system according to claim 1, wherein data of a type of the task, a start time of the task, and an end time of the task is accepted as the label.

8. An analysis device,
the analysis device inputting second time-series data to the first model trained by the training device according to claim 1,
the second time-series data being an analysis object,
the analysis device analyzing a period of the task in the second time-series data.

9. The analysis device according to claim 8, wherein the analysis device analyzes a period of an operation other than the task based on an appearance timing of the pattern in the second time-series data and one or two change points of a state in the second time-series data.

10. A training method of training a first model, the first model estimating a period of a task from time-series data, the time-series data being of an operation of a human, the method comprising:
acquiring, via an acceleration sensor that is attached to a portion of the body of the human, first time-series data to which a label of the task is assigned;
extracting a pattern from a period indicated by the label in the first time-series data, the pattern being used as a feature;
calculating a similarity between the pattern and each of a plurality sets of comparison data to generate time-series data of similarity, the plurality sets of comparison data being cut out from the first time-series data;
generating timing data of an appearance timing of the pattern in the first time-series data by binarizing the time-series data of similarity through comparison with a predetermined threshold; and
training the first model by using the label, the first time-series data, and the timing data.

11. A storage medium storing a program, the program causing a computer to perform the training method according to claim 10.

12. A system comprising:
an acceleration sensor configured to be attached to a portion of a body of a human; and
a training device including at least one processor and at least one memory storing instructions and configured to train a first model, the first model estimating a period of a task from time-series data of an operation of a human,
wherein the training device is configured to
acquire first time-series data, from the acceleration sensor when the acceleration sensor is attached to the portion of the body of the human, to which a label of the task is assigned,
cut out a plurality of candidate patterns and a plurality sets of comparison data from a period indicated by the label in the first time-series data,
calculate, for each of the plurality of candidate patterns, a similarity between the candidate pattern and each of the plurality sets of comparison data,
select, based on the calculated similarities, one pattern as a feature pattern of the first time-series data from the plurality of candidate patterns,
generate timing data of an appearance timing of the pattern in the first time-series data, and
train the first model by using the label, the first time-series data, and the timing data.

13. The system according to claim 12, wherein
the first time-series data is multidimensional,
the training device reduces dimensions of the first time-series data, and
the training device extracts the pattern from the reduced first time-series data.

14. The system according to claim 12, wherein
the first time-series data is multidimensional data of operations of a plurality of parts and operations of a plurality of joints of a body,
the training device extracts a portion of dimensions of the first time-series data,
the training device extracts the pattern from the extracted first time-series data and generates the timing data for each dimension of the portion of dimensions, and
the training device trains the first model by using the label, the extracted first time-series data, and a plurality of sets of the timing data.

15. The system according to claim 12, wherein
a plurality of the labels of a plurality of the tasks is assigned to the first time-series data,
the training device extracts a plurality of the patterns respectively from a plurality of periods indicated by the labels,
the training device generates a plurality of sets of the timing data of appearance timing of the plurality of patterns in the first time-series data, and
the training device trains the first model by using the labels, the first time-series data, and the sets of timing data to cause the first model to estimate periods of the tasks from the time-series data.

16. The system according to claim 12, wherein
the training device generates array data by two-dimensionally arranging values of the first time-series data,
the array data is input to the first model, and
the training device trains the first model by using the label, the array data based on the first time-series data, and the timing data.

17. The system according to claim 12, wherein
the first model includes a neural network including a convolutional layer and an attention layer,
the training device trains the first model by using the first time-series data as input data and by using the label as teaching data, and
the training device uses the timing data to evaluate the first model when training.

18. The system according to claim 12, wherein
data of a type of the task, a start time of the task, and an end time of the task is accepted as the label.

19. An analysis device,
the analysis device inputting second time-series data to the first model trained by the training device according to claim 12,
the second time-series data being an analysis object,
the analysis device analyzing a period of the task in the second time-series data.

20. The analysis device according to claim 19, wherein
the analysis device analyzes a period of an operation other than the task based on an appearance timing of the pattern in the second time-series data and one or two change points of a state in the second time-series data.

* * * * *